United States Patent
Boateng

Patent Number: 5,225,054
Date of Patent: Jul. 6, 1993

[54] METHOD FOR THE RECOVERY OF CYANIDE FROM SOLUTIONS

[75] Inventor: Daniel A. D. Boateng, Montrose, Canada

[73] Assignee: Cominco Ltd., Vancouver, Canada

[21] Appl. No.: 844,097

[22] Filed: Mar. 2, 1992

[51] Int. Cl.$^5$ ............................................. C25B 1/00
[52] U.S. Cl. .................................. 204/130; 204/151; 204/182.4; 204/182.5; 204/103; 204/98
[58] Field of Search ............... 204/151, 182.4, 182.5, 204/103, 98

[56] References Cited

U.S. PATENT DOCUMENTS 4,519,880 5/1985 Byerley et al. ..................... 204/91

Primary Examiner—John Niebling
Assistant Examiner—Arun S. Phasge
Attorney, Agent, or Firm—Arne I. Fors

[57] ABSTRACT

Cyanide-containing solution is subjected to two-stage membrane electrolysis in units each comprising a cathode, an anode and one or more bipolar electrodes interspaced with cationic membranes defining alternating anode and cathode compartments containing anolyte and catholyte, respectively. Electrolysis causes generation of hydrogen cyanide in the recirculating first stage anolyte, and alkali metal hydroxide is formed in the recirculating first-stage catholyte. The hydrogen cyanide is stripped from the first stage anolyte and is subsequently absorbed in catholyte in an absorption unit for the recovery of alkali metal cyanide-containing solution. Partially cyanide-depleted first-stage anolyte is mixed with an amount of an alkali metal chloride and passed as second-stage anolyte through the second-stage unit for the generation of chlorine with destruction of residual cyanide in the anolyte and the formation of alkali metal hydroxide in the recirculating second-stage catholyte from which a portion is directed to the absorption. A substantially cyanide-free effluent is withdrawn from the circulating second-stage anolyte. To allow for the formation of solid precipitates in the anolyte of the membrane electrolysis stages, the width of the anode compartments may be increased to at least 5 mm. Electrolysis is carried out at current densities in the range of 20 A/m$^2$ to 350 A/m$^2$ and at ambient temperatures.

15 Claims, 3 Drawing Sheets

METHOD FOR THE RECOVERY OF CYANIDE FROM SOLUTIONS

This invention relates to a method for the recovery of cyanide from cyanide-containing solutions, and, more particularly, to a method for the recovery of cyanide and the subsequent destruction of residual cyanide.

BACKGROUND OF THE INVENTION

Cyanide-containing solutions are being used in a number of industrial processes which include metal plating processes and metallurgical processes for the recovery of precious metals, especially gold. These and other processes are the source of cyanide-containing waste solutions which must be treated for the removal of cyanide prior to discharge into the environment.

Many methods have been developed for the removal of cyanide from waste waters and solutions. The removal processes include such operations as dialysis, electrodialysis, membrane electrolysis and electrochemical oxidation and reduction with and without the addition of alkali metal chloride, alkali metal oxychloride or chlorine. The methods disclosed in the prior art are generally directed either to the concentration and recovery of cyanide or to the destruction of cyanide in solution. Either type of method has a serious disadvantage. The concentration and recovery methods leave a residual solution that still contains cyanide, and such residual solutions can not be discharged to the environment. The destruction methods remove substantially all cyanide without recovery thereby losing cyanide that must be replaced in the process wherein cyanide is used.

SUMMARY OF THE INVENTION

I have now found that cyanide-containing solutions may be successfully treated in a two-stage process, wherein a major portion of the cyanide content is recovered in the first stage, and residual cyanide in solution from the first stage is destructed in the second stage with the formation of a substantially cyanide-free effluent.

More specifically, alkali metal cyanide-containing feed solution obtained from a cyanide-using operation is subjected to a first-stage membrane electrolysis (ME) in a ME unit comprising at least two cells. Each cell of the ME unit consists of an anode (anodic) compartment and a cathode (cathodic) compartment separated by a monovalent cation permselective membrane. In a two-cell unit, the compartments contain a monopolar anode and a monopolar cathode as terminal electrodes with an intermediate bipolar electrode forming two anode and two cathode compartments. In a more-than-two-cell unit, bipolar electrodes are positioned between a monopolar anode and a monopolar cathode forming a multiplicity of alternating anode and cathode compartments. The units may either have a rectangular shape or a cylindrical shape or a combination of a rectangular and a cylindrical unit may be used.

The feed solution is fed to the anode compartments of the first-stage ME unit. The electrical current applied to the electrodes causes the generation of hydrogen cyanide in the first-stage anolyte, which is being circulated through the anode compartments, forming a partially cyanide-depleted anolyte, and the formation of alkali metal hydroxide in the first-stage catholyte which is being recirculated through the cathode compartments. The generated hydrogen cyanide is stripped from the first-stage anolyte in a stripping unit, and is fed to an absorption. A portion of the circulating first-stage catholyte is withdrawn and is also fed to the absorption, where the hydrogen cyanide is absorbed with the formation of alkali metal cyanide-containing solution. This alkali metal cyanide-containing solution, which contains a major portion of the cyanide in the feed solution, is recovered and returned to the cyanide-using operation.

The first-stage anolyte is circulated through the anode compartments and the stripping unit. A portion of the circulating, partially cyanide-depleted first-stage anolyte is withdrawn from circulation, is mixed with a small amount of an alkali metal chloride, and the mixture is passed as second-stage anolyte to and is circulated through the anode compartments of the second-stage ME unit. The second-stage ME unit is similar to the first-stage ME unit. In the second-stage unit, electrolysis causes the formation of chlorine in the second-stage anolyte circulating through the anode compartments, and causes the formation of alkali metal hydroxide in the second-stage catholyte circulating through the cathode compartments. The chlorine destructs the residual cyanide in the anolyte, and a substantially cyanide-free anolyte is withdrawn as effluent. The effluent may contain free chlorine dissolved therein. A portion of the circulating second-stage catholyte is fed to the absorption for hydrogen cyanide.

The first-stage and second-stage catholytes may be passed to a catholyte circulation vessel wherefrom catholyte is withdrawn for circulation to the first-stage and second-stage ME cathode compartments, and to the absorption of hydrogen cyanide. The second-stage anolyte may be circulated through an anolyte circulation vessel. Partially cyanide-depleted first-stage anolyte and the alkali metal chloride are added and the cyanide-free anolyte is withdrawn as effluent from the anolyte circulation vessel.

The process is operated at ambient temperatures, at a current density for both ME stages in the range of about 20 $A/m^2$ to 250 $A/m^2$, and with a feed solution to the ME that may contain as little as 10 mg/L but, preferably, should contain at least about 100 mg/L total cyanide. About 90% of the free cyanide in the feed solution can be recovered and the substantially cyanide-free effluent usually contains <1 mg CN/L.

In order to allow for the formation of solid precipitates in the anolytes of the ME, the ME units may be designed with an appropriately chosen spacing between a membrane and an anode such that any solids may be flushed out by the anolyte flowing through the anode compartments. In case of solids formation, the spacing between a membrane and an anode should be at least about 5 mm.

Accordingly, there is provided a method for the recovery of cyanide from an alkali metal cyanide-containing feed solution and the formation of an essentially cyanide-free effluent by two-stage membrane electrolysis in a first-stage electrolysis unit and a second-stage electrolysis unit, each unit comprising electrodes consisting of an anode, a cathode and at least one bipolar electrode intermediate said anode and said cathode and monovalent cation permselective membranes between said anode, cathode and bipolar electrode forming alternating anode and cathode compartments, said method comprising the steps of circulating anolyte through the anode compartments and circulating catholyte through the cathode compartments of each of said first- and second-stage electrolysis units; feeding said alkali metal cyanide-containing feed solution into circulating first-stage anolyte; applying an electrical current between the anode and the cathode of said first-stage unit, said current causing the generation of hydrogen cyanide in said first-stage anolyte in the anode compartments of said first-stage unit with the formation of partially cyanide-depleted solution containing generated hydrogen cyanide; forming alkali metal hydroxide in the circulating first-stage catholyte in the cathode compartments of said first-stage unit; stripping hydrogen cyanide from said partially cyanide-depleted solution containing generated hydrogen cyanide; mixing partially cyanide-depleted solution substantially free of hydrogen cyanide with an amount of an alkali metal chloride to form a mixture; circulating said mixture through the anode compartments of the second-stage electrolysis unit as second-stage anolyte; applying an electrical current between the anode and the cathode of said second-stage unit, said current causing the generation of chlorine in said second-stage anolyte in the anode compartments of said second-stage unit, said chlorine causing destruction of cyanide in said mixture with the formation of said substantially cyanide-free effluent; forming alkali metal hydroxide in the circulating second-stage catholyte in the cathode compartments of said second-stage unit; absorbing stripped hydrogen cyanide in at least a portion of said circulating first-stage catholyte and a portion of said circulating second-stage catholyte for the formation of alkali metal cyanide-containing solution; recovering formed alkali metal cyanide-containing solution for the recovery of a major portion of the alkali metal cyanide contained in said feed solution; and removing said substantially cyanide-free effluent.

According to a preferred embodiment, at least one of the first- and the second-stage electrolysis units has anode compartments with a distance between the electrode and the membrane of at least about 5 mm. Preferably, anode compartments have a distance between the electrode and the membrane in the range of about 5 to 100 mm, and cathode compartments have a distance between the electrode and the membrane of not greater than about 1 mm.

It is an aspect of the present invention to provide a method for the recovery of cyanide from cyanide-containing solutions.

It is another aspect to provide a method for the substantial destruction of cyanide in cyanide-containing solutions.

It is yet another aspect to provide a method for the recovery of cyanide from cyanide-containing solutions and for the destruction of any residual cyanide.

It is further aspect to recover cyanide from and destruct residual cyanide in cyanide-containing solutions using an integrated two-stage membrane electrolysis process.

BRIEF DESCRIPTION OF DRAWINGS

The aspects of the invention will become clear from the following detailed description with reference to the accompanying drawings, wherein.

DETAILED DESCRIPTION

Cyanide-containing solutions that can be treated according to the method of the present inventions are solutions that contain alkali metal cyanide. Solutions are obtained from processes for the preparation of chemicals, metal treatments such as plating, coating, etching and the like processes, and metallurgical processes, particularly precious metal recovery processes, wherein cyanide solutions are used. The alkali metal cyanide may be either sodium cyanide or potassium cyanide. After being used in these processes, the residual solutions contain the alkali metal cyanide, and contain cyanide as cyanide ions, and may contain metal ions, such as, for example, iron, nickel, cadmium, zinc or copper ions, or complex metal cyanide ions originating from the metal treatment, the chemical processes or the metallurgical processes. The complex cyanides may include those containing the metals iron, nickel, cadmium, zinc, copper, silver and gold. When the cyanide-containing solution contains silver or gold cyanide complexes, the solution is preferably treated to remove these complexes prior to submitting the solution to the process of the invention. The relative cyanide and metal ion concentrations determine whether the metal is present as metal ion or as complex metal cyanide ion or, in some cases, as both. The cyanide solutions to be treated according to the instant invention should be essentially free of solids but may contain constituents, such as metals and/or complex metal cyanides, that may form solid precipitates such as cyanides and hydroxides during treatment. The cyanide-containing solutions that can be treated may contain as little as 10 mg total cyanide/L but, to make recovery worthwhile, should contain at least about 100 mg total cyanide/L. The solutions may contain as much as several thousand mg total cyanide/L. If desired, dilute solutions may be concentrated prior to treatment.

The following description is made with reference to a sodium cyanide-containing feed solution, the use of sodium chloride and the generation of sodium hydroxide. It is understood that the process can be carried out equally well with the corresponding potassium compounds.

Figure 1:
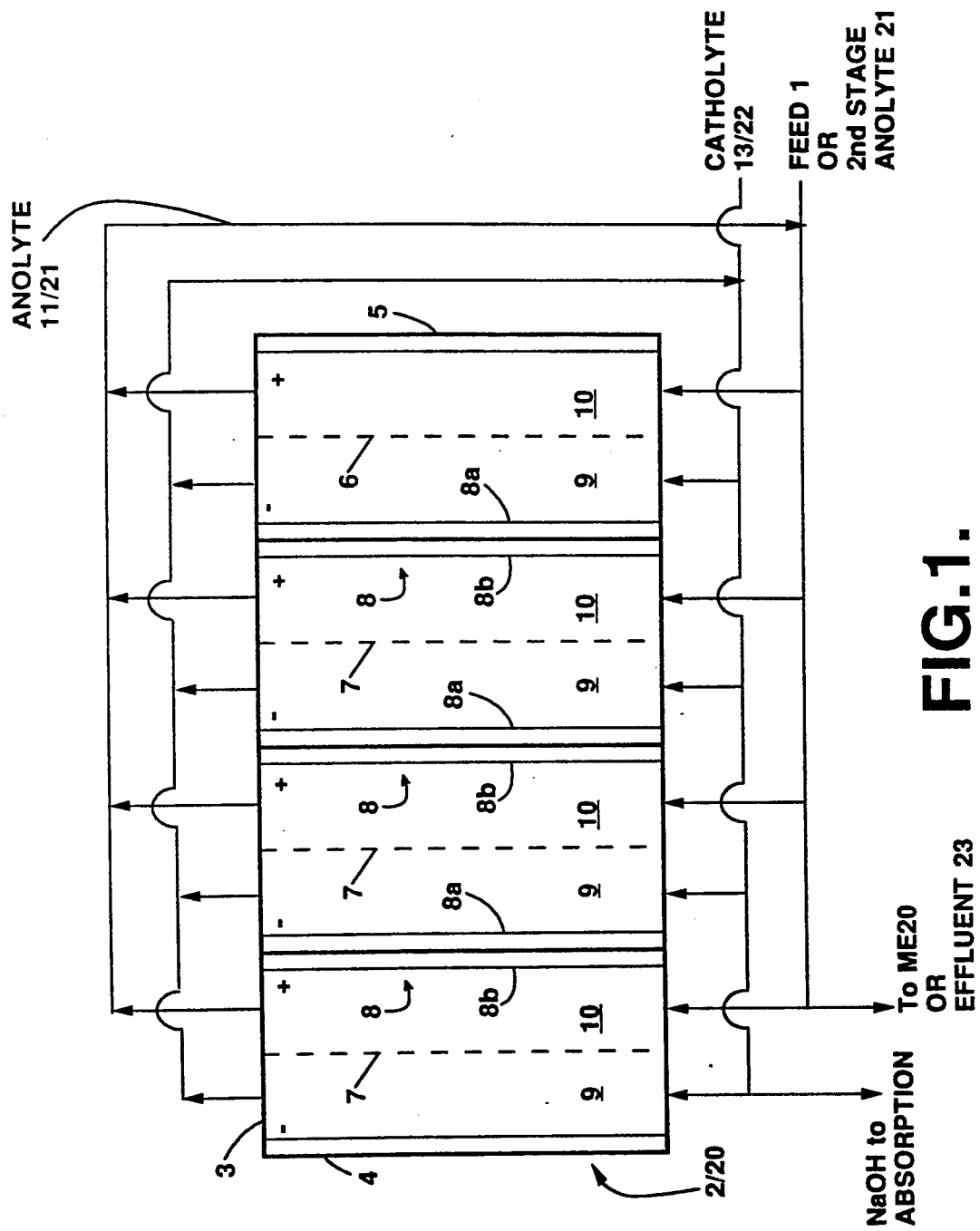
FIG. 1 is a schematic of the first-stage and second-stage electrolysis units and solution flows through those units.

With reference now to FIG. 1, cyanide-containing solution that contains cyanide ions and may, additionally, contain dissolved complex cyanides or dissolved metals or both, is fed as feed solution 1 to a first-stage membrane electrolysis (ME) unit, generally indicated with 2.

The first-stage ME unit 2 comprises a number of two-compartment, bipolar electrode cells. A four-cell unit is illustrated, but a unit may contain from two to a multiplicity of cells. The unit 2 comprises a housing 3, a terminal cathode 4 and a terminal anode 5 placed at opposite ends of housing 3, and at least one electrode/membrane group. Each electrode/membrane group consists of a cationic membrane 7 and an intermediate electrode, which is a bipolar electrode 8 having a cathodic side 8a and an anodic side 8b. A terminal (additional) cationic membrane 6 is positioned between terminal anode 5 and the cathodic side 8a of the adjacent bipolar electrode 8. The number of electrode membrane groups, and hence the number of electrode cells, depends on the desired capacity of the unit. A cathode compartment 9 is defined between a cationic membrane 7 and cathodic side 8a of a bipolar electrode 8, between a cationic membrane 7 and terminal cathode 4, and between terminal cationic membrane 6 and the cathodic side 8a of adjacent bipolar electrode 8. An anode compartment 10 is formed between each cationic membrane 7 and the anodic side 8b of a bipolar electrode 8 and between terminal cationic membrane 6 and terminal anode 5. Thus, the unit has alternating anode and cathode compartments.

The terminal electrodes 4 and 5 are connected to a source (not shown) of direct electrical current. The terminal anode 5 is made of an acid-resistant material such as, for example, lead, graphite, platinum or iridium; lead alloys of silver, antimony or calcium; or platinum-coated or iridium oxide-coated valve metals. The terminal cathode 4 is made of an alkali-resistant material such as, for example, copper, lead, nickel, iron, steel, tin, silver, graphite, gold, platinum, palladium or platinum-plated titanium, iridium or iridium oxide, zirconium or niobium, or alloys of lead or nickel.

Each bipolar electrode 8 has a cathodic side 8a and an anodic side 8b, and is made from a suitable, electrically conductive material or composite that, when the direct current is applied between the terminal electrodes 4 and 5, causes formation of oxygen at the anodic side 8b and formation of hydrogen at the cathodic side 8a. Suitable materials for the bipolar electrodes comprise, for example, graphite, metals such as lead, alloys such as antimony-lead, silver-lead or calcium-lead; and composites such as titanium coated with a noble metal, or a metal with a cathodic side of, for example, nickel and an anodic side of platinum, or platinum-plated niobium, tantalum, titanium or zirconium, iridium or iridium oxide-coated titanium or a bimetallic electrode with a cathodic side of steel and an anodic side of any of the suitable materials listed above for the terminal anode.

The cationic membranes 6 and 7 are suitable monovalent cation permselective membranes such as those that have, for example, strongly acidic active groups and a membrane matrix of a styrene di-vinyl benzene copolymer on a polyvinyl chloride base, the active groups being sulfonic acid radicals (R—SO$_3$H). Suitable cationic membranes include sulfonated or carboxylated per fluorocarbon membranes. Suitable membranes 6 and 7 are treated Selemion TM CMR, Selemion TM CMD, Selemion TM CSR, Selemion TM CMT and, especially, treated Selemion TM CMF membranes, manufactured by the Asahi Glass Company of Japan, and equivalent membranes manufactured by other companies.

Figure 2:
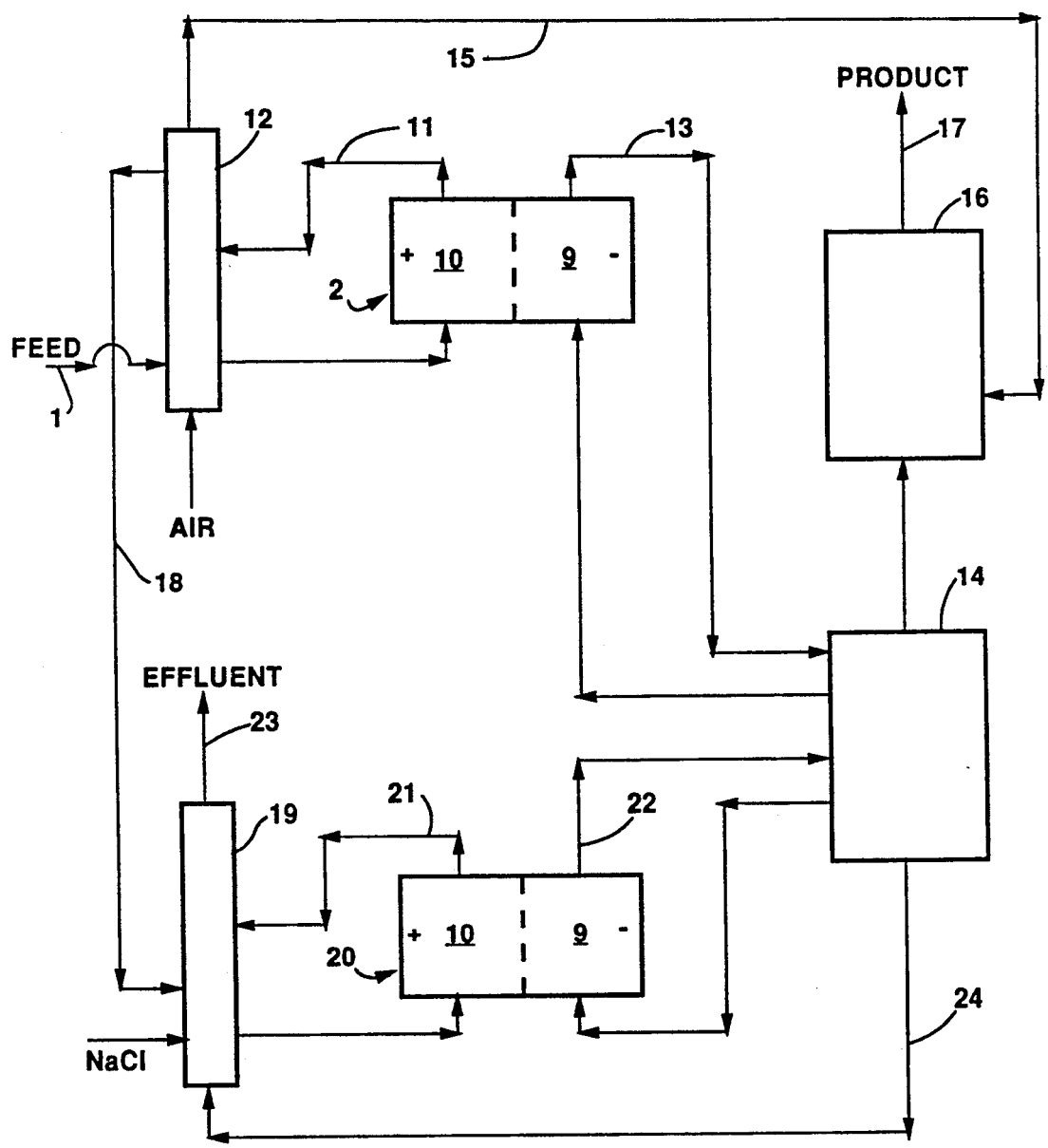
FIG. 2 is a schematic flowsheet of a preferred embodiment of the method according to the invention.

With reference now to FIGS. 1 and 2, a sodium cyanide-containing feed solution 1 is indirectly fed to each of the anode compartments 10 of first-stage electrolysis unit 2. (In FIG. 2, the anode and cathode compartments, respectively, are schematically indicated as single compartments). A first-stage anolyte 11 is supplied to and is circulated through anode compartments 10. The circulating anolyte 11 is also passed through a stripping unit 12, and feed solution 1 is, preferably, added to the circulating first-stage anolyte 11 in stripping unit 12. A first-stage catholyte 13 is supplied from a catholyte circulation vessel 14 to and circulated through cathode compartments 9. Although the flows of catholyte and anolyte through the ME units are shown in FIGS. 1 and 2 as being co-current, the flows may also be counter-current. First-stage anolyte 11 is a cyanide-containing solution that is becoming partially depleted in cyanide, as will be explained. First-stage catholyte 13 is a solution that is becoming enriched in sodium or other monovalent ions, as will be explained. A direct electrical current is applied from a source of direct current (not shown) between terminal cathode 4 and terminal anode 5. The current should be sufficient to cause the generation of hydrogen cyanide in anolyte 11 in anode compartments 10 forming partially cyanide-depleted solution containing generated hydrogen cyanide. Sodium and any other monovalent cations present in the feed solution pass through the monovalent cation permselective membranes 6 and 7 from the anode compartments 10 into first-stage catholyte 13 circulating through cathode compartments 9. First-stage catholyte 13, thereby, becomes enriched in sodium hydroxide and other monovalent cations. Multivalent ions will substantially remain in the anolyte, while metal cyanide complexes may either dissociate with the generation of hydrogen cyanide or precipitate depending on the concentration of a cyanide complex in the anolyte.

In stripping unit 12, the hydrogen cyanide generated in circulating anolyte 11 is stripped with a flow of air passed into the unit forming a flow of hydrogen cyanide 15 and partially cyanide-depleted solution 18 substantially free of hydrogen cyanide. Flow 15 and solution 18 are separately removed from unit 12. The stripping unit is preferably a cylindrical column.

The flow of hydrogen cyanide 15 is conducted to an absorption 16 wherein it is absorbed into a portion of catholyte passed from catholyte circulation vessel 14 with the formation of a sodium cyanide-containing solution 17 as product, which is returned for use in the metal treatment or in the chemical or metallurgical process.

The cyanide-containing feed solution 1 is usually strongly alkaline, and may have a value of the pH of about 10 to 13. As a result of the reactions taking place in the first stage ME, the acidity strongly increases so that the anolyte 11 usually has a pH of about 1 to 4.

Partially cyanide-depleted solution 18 is removed from stripping unit 12, usually at a rate about equal to the rate of addition of feed solution 1 to unit 12. Using well-known means, no "short circuiting" in stripping unit 12 occurs between feed 1 and solution 18. The solution 18 is passed to an anolyte circulation vessel 19. Anolyte from vessel 19 is passed to a second-stage ME unit, generally indicated with 20. Second-stage ME unit 20 is similar to unit 2 as described with reference to FIG. 1. A second-stage anolyte 21 is supplied to and circulated through anode compartments 10. Anolyte 21 is also passed through anolyte circulation vessel 19. A second-stage catholyte 22 is passed to and is circulated through cathode compartments 9 from catholyte circulation vessel 14. Vessel 19 is preferably a cylindrical vessel. In anolyte circulation vessel 19, solution 18 and second-stage anolyte 21 are mixed with an amount of sodium chloride. The amount of sodium chloride should be sufficient to cause the generation of a quantity of chlorine in second-stage ME unit 20. An amount of sodium chloride added in the range of about 2 to 15 g/L of solution 18 has generally been found adequate for the substantially complete destruction of residual cyanide in solution 18 (and anolyte 21).

A direct electrical current is applied between terminal cathode 4 and terminal anode 5 from a source (not shown) of electrical current. The current passing between the terminal electrodes causes the electrolysis of the sodium chloride in second-stage anolyte 21 with the generation of chlorine in the anode compartments 10 and the formation of sodium hydroxide in the cathode compartments 9. The amount of sodium chloride in anolyte 21 must be sufficient to generate a quantity of chlorine that is at least sufficient to destruct substantially all the cyanide present in the partially cyanide-depleted first-stage anolyte, i.e. solution 18. The second-stage anolyte 21 would normally have a pH similar to that of the first-stage anolyte 11, but the pH of anolyte 21 may be controlled by adding an amount of catholyte 24 from catholyte circulation vessel 14 to anolyte circulation vessel 19. Sodium ions and any other monovalent cations present in the feed (anolyte 21) to second-stage ME unit 20 pass through monovalent cation permselective membranes 6 and 7 from anode compartments 10 into cathode compartments 9 with the formation of sodium hydroxide.

The chlorine generated in anode compartments 10 of second-stage ME unit 20 reacts with the cyanide in the anolyte 21 passing through compartments 10 for the substantial destruction of the cyanide, including any metal cyanide complexes, to carbon dioxide and nitrogen. The substantial destruction of cyanide in second-stage anolyte 21 causes the formation of a substantially cyanide-free anolyte, which, if desired, may contain an excess of dissolved chlorine. An excess of chlorine in the effluent may be desired, for example, in processes for the recovery of precious metals. Depending on the ambient temperatures an excess of about 1 to 4 g/L may be desirable. As sodium chloride is regenerated in the second stage, only a small amount must be added to make up for losses and to provide any excess chlorine. The substantially cyanide-free anolyte is an effluent 23 which is removed from anolyte circulation vessel 19. Using well-known means, no short-circuiting occurs between portion 18 and effluent 23. If feed solution 1 contains dissolved metals or metal cyanide complexes, multivalent metals will be present in effluent 23. Effluent 23 must then be treated such as, for example, by adjusting the pH to about 9.5 for the further removal of such metals prior to removal of the effluent to a tailings pond, other containment or the environment.

The circulating first-stage catholyte 13 and the circulating second-stage catholyte 22 are both passed through catholyte circulation vessel 14 and the catholyte streams for circulation to units 2 and 20 are common solution from vessel 14. A portion of the catholyte is withdrawn from vessel 14 and is passed to absorption 16, where it absorbs the flow of hydrogen cyanide 15 from stripping unit 12 for the formation of sodium cyanide-containing product solution 17. Fresh solution, which may be water or dilute sodium hydroxide solution, may be added to the catholyte in vessel 14 as necessary to substantially replenish any portion withdrawn from circulation.

The feed solution 1 to the ME units 2 and 20 should be substantially free of solids, but the solution may contain complex cyanides and metal cations such as iron, nickel, cadmium, copper, zinc and other metals. In particular, the ions of metal cyanide complexes of the aforesaid metal cations may form precipitates in the anode compartments of either one of or both the first-stage unit 2 and second-stage unit 20. The distances between membranes and electrodes in a pack of cells of ME units are normally in the order of about 1 mm. In case of solids formation, it has been found that these solids accumulate in the ME units and cause clogging of the units. In order to accommodate such precipitates and avoid clogging of the units, it has been found that when the width of the anode compartments 10 is increased solids are readily removed and no clogging occurs. The width may be increased in either one or both the ME units. The distance between a membrane and an electrode of an anode compartment in case of solids formation is increased to at least about 5 mm. The width of the anode compartments 10 is, preferably, increased to a distance in the range of about 5 mm to 100 mm, most preferably about 5 mm to 50 mm. The width of the cathode compartments 9 may also be increased but may also be retained at the usual value of about 1 mm or less.

The ME units 2 and 20 may be constructed in a rectangular shape having parallel electrodes and membranes. Alternatively the units may have a cylindrical shape having concentric electrodes and at least one membrane. In its simplest form, a cylindrical unit may comprise a cylindrical housing with a central rod-like anode, a cylindrical cathode on the inside wall of the housing and a cation exchange membrane mounted concentrically in the space between the two electrodes forming a cathode compartment and an anode compartment. A combination of a rectangular cell and a cylindrical cell may be used.

Figure 3:
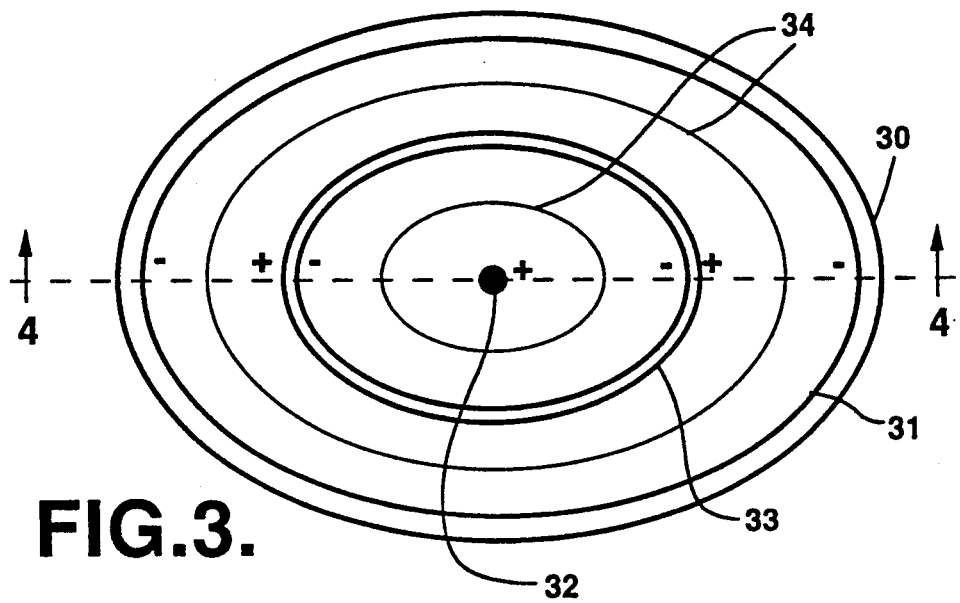
FIG. 3 is a top plan view of a cylindrically shaped first- and second-stage electrolysis unit.
Figure 4:
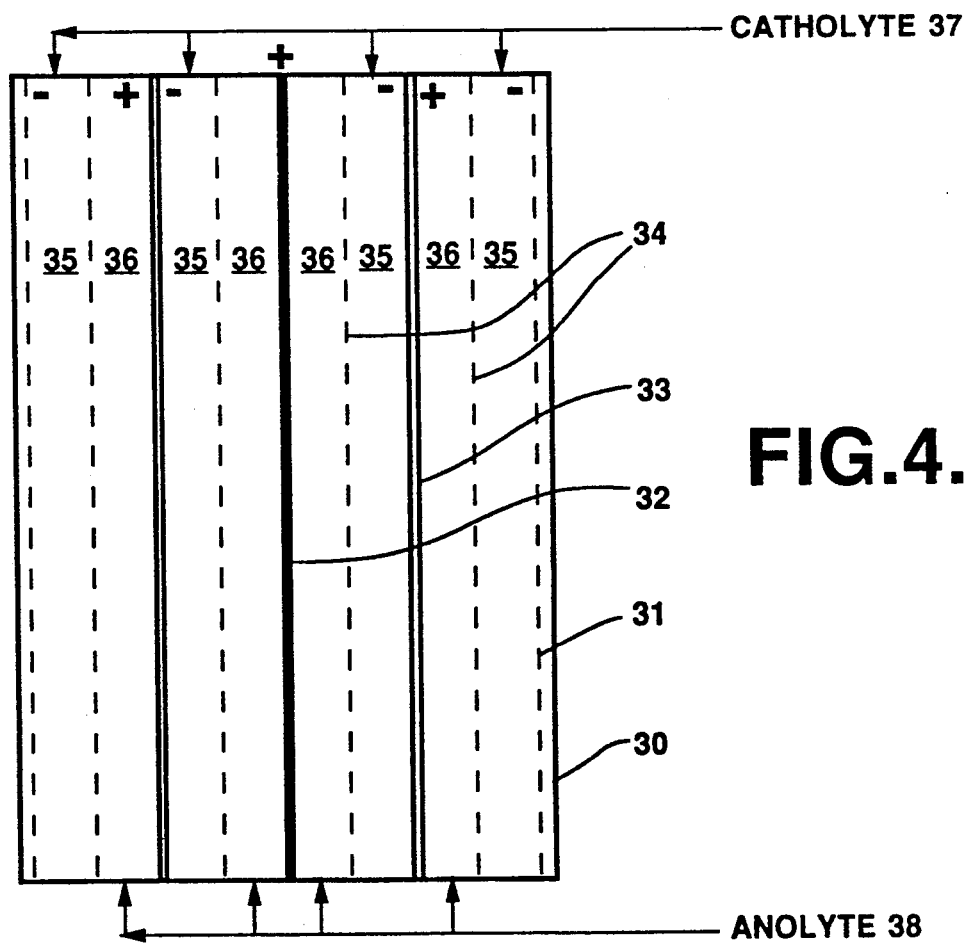
FIG. 4 is a vertical section through line 4—4 of FIG. 3.

With reference to FIGS. 3 and 4, a cylindrical ME unit, according to the invention, comprises a cylindrical housing 30, a cylindrical terminal cathode 31 on the inside wall of housing 30 or in spaced proximity thereto, and a cylindrical or rod-like terminal anode 32 mounted in the centre of housing 30. Between housing 30 and terminal anode 32 are positioned at least one electrode/membrane group, each consisting of a cationic membrane 34 and a bipolar electrode 33 having a cathodic and an anodic side, and mounted concentrically around the anode 32 in spaced relationships. Cathode compartments 35 are defined between a membrane and the cathode or the cathodic side of a bipolar electrode, and anode compartments 36 are defined between a membrane and the anode or the anodic side of a bipolar electrode. An additional membrane is to be used to ensure that a membrane is present between each of the cathodic and anodic electrode surfaces. As with rectangularly shaped units, the membranes 34 may be the same as those described with reference to FIG. 1. The anode 32 the cathode 31 and the bipolar electrode 33 may be made of the same materials as described with reference to FIG. 1. The cathode may also be made of steel mesh. Catholyte 37 is circulated through cathode compartments 35, and anolyte 38 is circulated through anode compartments 36. The directions of flow may be either co-current or counter-current. The flows of streams to, from and through a cylindrically shaped unit are similar to those of a rectangularly shaped unit.

The method of the invention is carried out at ambient temperatures, such as in the range of about 5° C. to 50° C. The first- and second-stage ME units are operated with currents equivalent to current densities, expressed as $A/m^2$ of membrane surface area, in the range of about 20 $A/m^2$ to 350 $A/m^2$, preferably 50 $A/m^2$ to 350 $A/m^2$. The current applied to the units may be the same or may have different values for each unit. Below about 20 $A/m^2$, the current is too low to be effective, while operating above about 350 $A/m^2$ would require a high final ionic concentration in the anolyte. Feed solution 1 is supplied to the process at a rate in the range of about 3 to 50 $L/h.m^2$, based on the first-stage unit membrane area. The rate chosen depends on the cyanide concentration in the feed. As destruction of residual cyanide in the second-stage is very efficient and fast, the second-stage can be fed at a much higher rate, that is, at least 2 times, and up to about 10 times higher, than the first-stage. Circulation rates of anolytes 11, 21 and 38, and catholytes 12, 22 and 37 are generally in the range of about 1.5 m³/h.m² to 5 m³/h.m² membrane surface area. These circulation rates may be the same or have different values for each solution and for each unit.

Using the method of the invention, 90% or more of the free cyanide in the feed solution may be recovered, and the substantially cyanide-free effluent usually contains less than about 1 mg total cyanide per liter.

The invention will now be illustrated by means of the following non-limitative examples.

EXAMPLE 1

A sodium cyanide-containing solution from a gold ore leaching operation and containing 335 mg/L total cyanide and 135 mg/L copper was recirculated through the anode compartments of the (first-stage) ME unit as described with reference to FIG. 1. The unit comprised a Pb-Ag alloy anode, a stainless steel cathode, three bipolar electrodes made of Pb-Ag alloy and four Selemion ™ CMD cation permselective membranes.

A total of 5 L of solution was treated at a feed flow rate of 19.5 L/h.m² of membrane surface area. The current density was 95 A/m² and the temperature was ambient (22° C. to 26° C.). The pH of the feed solution was 11.5. Water was initially circulated through the cathode compartments. Hydrogen cyanide was absorbed in sodium hydroxide solution. The final solutions were analyzed. The now partially cyanide-free solution had a pH of 1.5 and contained 19 mg/L total cyanide and 16 mg/L copper. The catholyte contained 13 g/L sodium hydroxide. It follows that a major portion (94%) of the cyanide was converted into hydrogen cyanide, which was recovered as 66% sodium cyanide-containing solution, and copper cyanide precipitate, equivalent to 28% of total cyanide in the feed. The precipitate was removed as solids in the anolyte.

EXAMPLE 2

Using the same electrolysis unit as in Example 1, 5 L of the solution of Example 1 were treated as in the second-stage electrolysis described with reference to FIG. 1. The unit was operated with a current density of 200 A/m² and with a rate of feed of 65 L/h.m². The feed solution having a pH of 11.5, was mixed with 25 g sodium chloride prior to electrolysis. No attempt was made to control the pH in the anolyte. Some solids were formed in the anolyte which were found to be predominantly copper cyanide.

The final solutions were analyzed. The substantially cyanide-free effluent had a pH of 1.6 and was found to contain 0.4 mg/L total cyanide and 59 mg/L copper, and contained 1.2 g/L chlorine. The catholyte contained 16 g/L sodium hydroxide. The results show that the cyanide content was reduced from 335 to 0.4 mg/L, a level normally suitable for discharge to the environment.

EXAMPLE 3

This example illustrates the concentration of a relatively dilute cyanide-containing solution prior to feeding the solution to the ME process of the invention. The concentration was carried out by electrodialysis. The electrodialysis unit used for the concentration had alternating Selemion ™ CMR and ASR cationic and anionic membranes, respectively, with a total effective membrane pair area of 1720 cm². Cyanide-containing solution obtained from the cyanide leach of a gold ore was fed into the circulating diluate stream. A concentrate stream was withdrawn from the circulating concentrate. The withdrawn concentrate stream was suitable as feed to the ME process of the invention. The concentration was carried out with two different dilute solutions. The feed rate of both solutions was 8.75 L/h.m² and electrodialysis was carried out at 70 A/m². The cyanide concentrations in the feed, diluate and concentrate solutions are given in Table I.

TABLE I

| | | mg/L CN | |
|---|---|---|---|
| | Feed | Diluate | Concentrate |
| 1 | 245 | 39 | 3700 |
| 2 | 485 | 83 | 7390 |

EXAMPLE 4

This example demonstrates the use of rectangular cell configuration in ME with bipolar electrodes in two stages, as illustrated in and described with reference to FIG. 2, to recover cyanide and to destroy residual cyanide from a cyanide-containing waste solution. The ME units were assembled according to the schematic shown in FIG. 1. The terminal cathodes and anodes were made of stainless steel and Pb-Ag alloy, respectively. The bipolar electrodes were bi-metal plates with a stainless steel cathodic surface and a Pb-Ag anodic surface. The unit had a total effective membrane area of 480 cm² and employed Selemion ™ CMT membranes. The electrodes and membranes were spaced 3 cm apart at the end compartments and 5 cm apart for the other compartments. The anolyte and catholyte solutions were circulated at a linear velocity of 1.22 m/h which ensured that the fine precipitate formed in the anolyte did not settle to the bottom of the units.

In the first-stage, the feed solution containing 820 mg/L cyanide was introduced at a rate of 15.6 L/h.m² by feeding it into circulating anolyte at the stripping column. Air was supplied to the stripping column to strip HCN, which was absorbed in a caustic solution in an absorption column. A portion of the circulating anolyte approximately equal to the raw feed solution was withdrawn and fed to the second-stage ME. Metal compound precipitates formed in the anolyte and were found to be predominantly copper cyanide. The feed to the second-stage ME unit contained 15 mg/L cyanide and was introduced at a rate of 62.4 L/h.m² by blending it with the second-stage circulating anolyte in the anolyte circulation vessel, together with sodium chloride added to give 5 g/L NaCl in solution. The pH of the second-stage anolyte was controlled at a value between 8.0 and 9.5 with caustic. Except at the initial stages of operation, a portion of the catholyte product was used for achieving the pH control. The catholytes from the two stages were combined and circulated through all cathode compartments, while a portion was withdrawn as catholyte (caustic) by-product. Both ME units were operated at a current density of 200 A/m². The effluent withdrawn from the anolyte circulation vessel contained less than 1 mg/L cyanide.

Caustic was generated in the cathode compartments at a current efficiency of 73.3% or a generation rate of 219 g/h.m² of membrane area. The overall cyanide removal and destruction amounted to 99.96% with approximately 85% recovered from the absorption of HCN to give a 3200 mg/L cyanide solution.

EXAMPLE 5

This example illustrates the use of a cylindrical cell configuration for treating cyanide-containing solutions in a single stage.

The cell was constructed as a simple cell with a single cation exchange membrane with an effective membrane area of 1216 cm$^2$ between a rod-like graphite anode and a cathode screen. The raw feed (pH 12.5) solution was introduced to a circulating anolyte at a rate which resulted in the anolyte pH controlled at a value of from 2.0 to 3.6. The anolyte was circulated at a linear velocity of 2.25 m/h through the anode compartment. The catholyte was circulated through the cathode compartment at a linear velocity of 4.3 m/h (although the linear velocity could have been selected in the range of 1 to 5 m/h). The anolyte was circulated through a stripping column in which air was used to strip the HCN generated, as in example 4. The formation of metal cyanide precipitates (predominantly CuCN$_2$) was observed in the anolyte. The feed solution which contained 1100 mg/L cyanide was fed at a measured rate of 9.6 L/h.m$^2$ to the ME unit by introducing it into the stripping column. The ME was carried out at a current density of 72 A/m$^2$.

A portion of the circulating anolyte approximately equal in volume to the raw feed was removed as treated solution. A portion of circulating catholyte was also withdrawn as a caustic by-product.

Thus, the treatment yielded a sodium cyanide solution containing 3950 mg/L cyanide, a caustic by-product and a treated solution containing less than 1 mg/L cyanide, suitable after pH adjustment for discharging to a tailing pond such as found in a gold recovery plant.

EXAMPLE 6

This example illustrates the use of the cylindrical cell configuration in a two-stage treatment of a cyanide-containing waste stream. The unit as described in Example 6 was employed in a two stage treatment according to which the first-stage ME comprised two units in parallel and the second stage ME comprised a single such unit. Auxiliary process steps, HCN stripping and absorption, second stage sodium chloride addition, feed and circulating anolyte handling, were similar to the scheme described in Example 5. The catholytes from both the first-stage and second-stage cathode compartments were circulated using a common recirculating tank out of which a caustic product was withdrawn.

The anolyte and catholyte were circulated at linear velocities of 2.25 m/h and 4.3 m/h, respectively. The waste stream containing 900 mg/L cyanide was fed at a rate of 14.4 L/h.m$^2$ into the stripping column and the feed rate to the second ME unit (second stage anolyte) was 57.6 L/h.m$^2$. The units were operated at a current density of 72 A/m$^2$. The first stage anolyte contained 45 mg/L cyanide.

The treated anolyte discharged from the second stage contained less than 1 mg/L cyanide and contained dissolved chlorine gas, which was beneficial when discharged to a tailing pond containing other cyanide-bearing effluents. 87% of the cyanide in the initial feed was recovered as a re-useable cyanide solution.

EXAMPLE 7

This example illustrates the removal of dissolved metal from waste streams fed to the process.

The results from the operation of the rectangular cell configuration under operational conditions as in Example 5, and those for cylindrical cell configuration under conditions described in Example 6 are shown in Table II. Table II shows dissolved metal removals achieved during the first stage membrane electrolysis.

TABLE II

| TEST # | CELL TYPE | ANOLYTE pH | mg/L IN SOLUTION | | | | | | | |
|---|---|---|---|---|---|---|---|---|---|---|
| | | | FEED | | | | TREATED ANOLYTE | | | |
| | | | Cu | Zn | Fe | Ni | Cu | Zn | Fe | Ni |
| 1 | Rectangular | 1.8 | 463 | 44 | — | 12 | 7 | 2 | — | 1.3 |
| 2 | Rectangular | 2.5 | 470 | 49 | 8 | 10 | 9 | 2 | 0.4 | 6 |
| 3 | Cylindrical | 1.6 | 500 | 29 | 58 | — | 12 | 1.4 | 0.6 | — |

The results show that the process of the present invention gives significant metal removal from solution.

It is understood that changes and modifications may be made in the method according to the invention without departing from the scope of the appended claims.

I claim:

1. A method for the recovery of cyanide from an alkali metal cyanide-containing feed solution and the formation of an essentially cyanide-free effluent by two-stage membrane electrolysis in a first-stage electrolysis unit and a second-stage electrolysis unit, each unit comprising electrodes consisting of an anode, a cathode and at least one bipolar electrode intermediate said anode and said cathode and monovalent cation permselective membranes between said anode, cathode and bipolar electrode forming alternating anode and cathode compartments, said method comprising the steps of circulating anolyte through the anode compartments and circulating catholyte through the cathode compartments of each of said first- and second-stage electrolysis units; feeding said alkali metal cyanide-containing feed solution into circulating first-stage anolyte; applying an electrical current between the anode and the cathode of said first-stage unit, said current causing the generation of hydrogen cyanide in said first-stage anolyte in the anode compartments of said first-stage unit with the formation of partially cyanide-depleted solution containing generated hydrogen cyanide; forming alkali metal hydroxide in the circulating first-stage catholyte in the cathode compartments of said first-stage unit; stripping hydrogen cyanide from said partially cyanide-depleted solution containing generated hydrogen cyanide; mixing partially cyanide-depleted solution substantially free of hydrogen cyanide with an amount of an alkali metal chloride to form a mixture; circulating said mixture through the anode compartments of the second-stage electrolysis unit as second-stage anolyte; applying an electrical current between the anode and the cathode of said second-stage unit, said current causing the generation of chlorine in said second-stage anolyte in the anode compartments of said second-stage unit, said chlorine causing destruction of cyanide in said mixture with the formation of said substantially cyanide-free effluent; forming alkali metal hydroxide in the circulating second-stage catholyte in the cathode compartments of said second-stage unit; absorbing stripped hydrogen cyanide in at least a portion of said circulating first-stage catholyte and a portion of said circulating second-stage catholyte for the formation of alkali metal cyanide-containing solution; recovering formed alkali metal cyanide-containing solution for the recovery of a major portion of the alkali metal cyanide contained in said feed solution; and removing said substantially cyanide-free effluent.

2. A method as claimed in claim 1, wherein said alkali metal cyanide-containing feed solution also contains at least one substance chosen from the group consisting of metal ions of iron, nickel, zinc, copper and cadmium and complex metal cyanide ions of iron, nickel, zinc, copper and cadmium.

3. A method as claimed in claim wherein said amount of alkali metal chloride mixed with said partially cyanide-depleted solution is in the range of about 2 to 15 g/L of said solution.

4. A method as claimed in claim 3, wherein said amount of alkali metal chloride is sufficient to provide an excess of chlorine in said effluent in the range of about 1 to 4 g/L.

5. A method as claimed in claim 1, wherein at least one of said first-stage unit and said second-stage unit has anode compartments with a distance between the electrode and the membrane of each of said anode compartments of at least about 5 mm.

6. A method as claimed in claim 1, wherein at least one of said first-stage unit and said second-stage unit has anode compartments with a distance between the electrode and the membrane of each of said anode compartments in the range of about 5 mm to 100 mm, and has cathode compartments with a distance between the electrode and the membrane of each of said cathode compartments of about 1 mm or less.

7. A method as claimed in claim 1, wherein said method is carried out at ambient temperatures and said first-stage electrolysis unit and said second-stage electrolysis unit are operated with currents equivalent to current densities in the range of about 20 $A/m^2$ to 350 $A/m^2$.

8. A method as claimed in claim 5, wherein said method is carried out at ambient temperatures and said first-stage electrolysis unit and said second-stage electrolysis unit are operated with currents equivalent to current densities in the range of about 20 $A/m^2$ to 350 $A/m^2$.

9. A method as claimed in claim 1, wherein said circulating first-stage anolyte is also circulated through a stripping unit, feed solution is added to said stripping unit, hydrogen cyanide is stripped in said stripping unit and stripped hydrogen cyanide and partially cyanide-depleted solution substantially free of hydrogen cyanide are separately removed from said stripping unit.

10. A method as claimed in claim 5, wherein said circulating first-stage anolyte is also circulated through a stripping unit, feed solution is added to said stripping unit, hydrogen cyanide is stripped in said stripping unit and stripped hydrogen cyanide and partially cyanide-depleted solution substantially free of hydrogen cyanide are separately removed from said stripping unit.

11. A method as claimed in claim 9, wherein said method is carried out at ambient temperatures and said first-stage electrolysis unit and said second-stage electrolysis unit are operated with currents equivalent to current densities in the range of about 20 $A/m^2$ to 350 $A/m^2$.

12. A method as claimed in claim 1, wherein said alkali metal cyanide is sodium cyanide, said alkali metal hydroxide is sodium hydroxide and said alkali metal chloride is sodium chloride.

13. A method as claimed in claim 1, wherein said alkali metal cyanide is potassium cyanide, said alkali metal hydroxide is potassium hydroxide and said alkali metal chloride is potassium chloride.

14. A method as claimed in claim 1, wherein said alkali metal cyanide-containing feed solution also contains at least one substance chosen from the group consisting of metal ions of iron, nickel, zinc, copper and cadmium and complex metal cyanide ions of iron, nickel, zinc, copper and cadmium; said amount of alkali metal chloride mixed with said partially cyanide-depleted solution is in the range of about 2 to 15 g/L of said solution; at least one of said first-stage unit and said second-stage unit has anode compartments with a distance between the electrode and the membrane of each of said anode compartments of at least about 5 mm; said method is carried out at ambient temperatures and said first-stage electrolysis unit and said second-stage electrolysis unit are operated with currents equivalent to current densities in the range of about 20 $A/m^2$ to 350 $A/m^2$; and said alkali metal of said alkali metal cyanide, said alkali metal hydroxide and said alkali metal chloride is chosen from the group consisting of sodium and potassium.

15. A method as claimed in claim 14, wherein said amount of alkali metal chloride is sufficient to provide an excess of chlorine in said effluent in the range of about 1 to 4 g/L; said at least one of said first-stage unit and said second-stage unit has anode compartments with a distance between the electrode and the membrane of each of said anode compartments in the range of about 5 mm to 100 mm, and has cathode compartments with a distance between the electrode and the membrane of each of said cathode compartments of about 1 mm or less; and said method is carried out at ambient temperatures and said first-stage electrolysis unit and said second-stage electrolysis unit are operated with currents equivalent to current densities in the range of about 50 $A/m^2$ to 350 $A/m^2$.

* * * * *